United States Patent [19]

Trucco

[11] 4,424,780

[45] Jan. 10, 1984

[54] INTERNAL COMBUSTION ENGINE FOR DIVERSE FUELS

[76] Inventor: Horacio A. Trucco, 13 Saddler Ct., Huntington Station, N.Y. 11746

[21] Appl. No.: 415,677

[22] Filed: Sep. 7, 1982

Related U.S. Application Data

[63] Continuation-in-part of Ser. No. 107,338, Dec. 26, 1979, Pat. No. 4,372,264.

[51] Int. Cl.³ .................... F02B 19/02; F02M 25/06
[52] U.S. Cl. .................................. 123/255; 123/292; 123/557; 123/568
[58] Field of Search ............... 123/143 B, 250, 252, 123/255, 275, 292, 557, 568

[56] References Cited

U.S. PATENT DOCUMENTS 887,703  5/1908  Sharpneck ..................... 123/292
892,296  6/1908  Oberhansli .................... 123/250
1,520,772 12/1924 Ricardo ....................... 123/143 B
4,103,648 8/1978  Jarry ............................ 123/316
4,223,645 9/1980  Nohira et al. ................. 123/292
4,300,497 11/1981 Webber ...................... 123/292 X Primary Examiner—Tony M. Argenbright

[57] ABSTRACT

A fuel vaporizer chamber that is interconnected with a conventional combustion chamber through a valve. The valve remains open during the combustion phase allowing hot combustion products to fill the chamber. The valve is closed during the expansion stroke to trap the products therein. Fuel is then injected into the chamber and vaporized. The valve is opened to release the vaporized fuel mixture into the conventional combustion chamber during the subsequent compression stroke. The charge is then ignited and the cycle is repeated.

12 Claims, 6 Drawing Figures

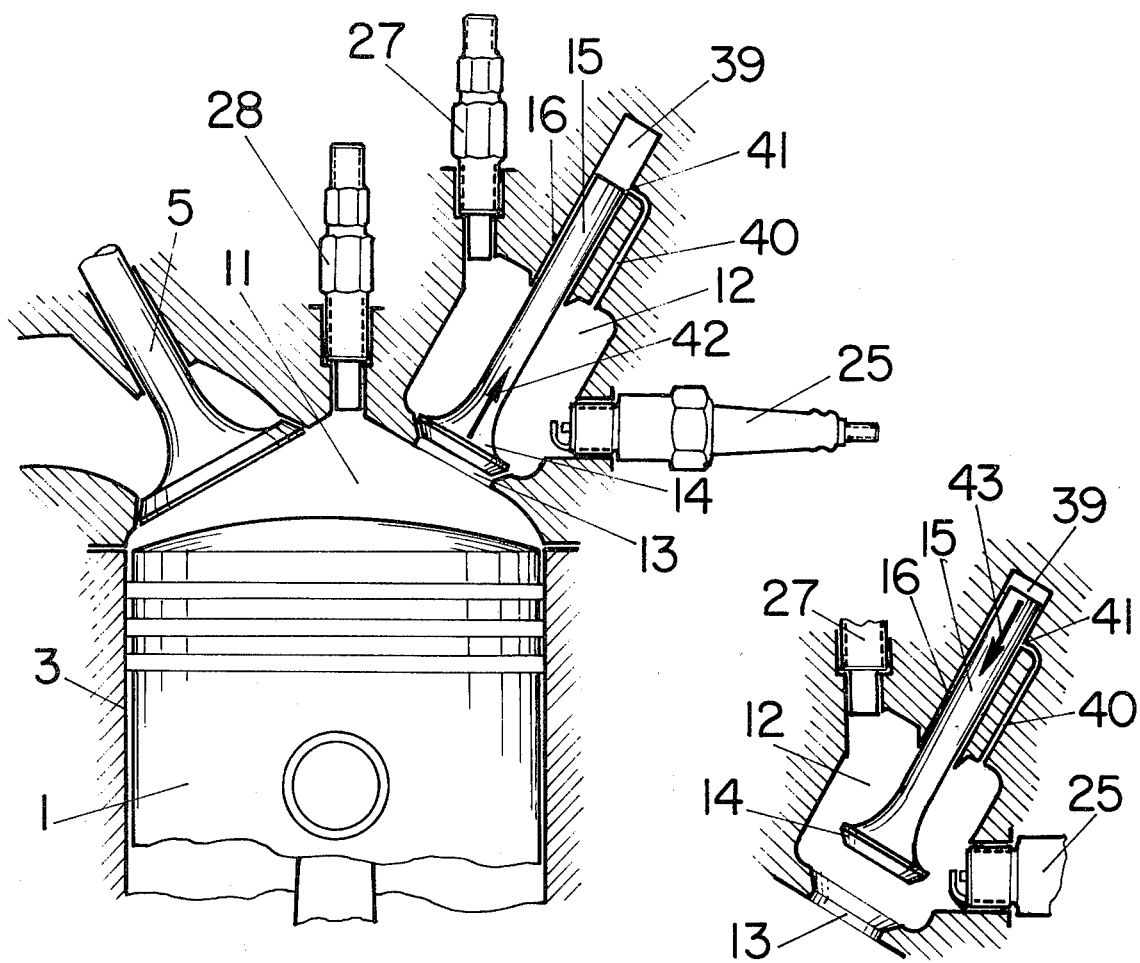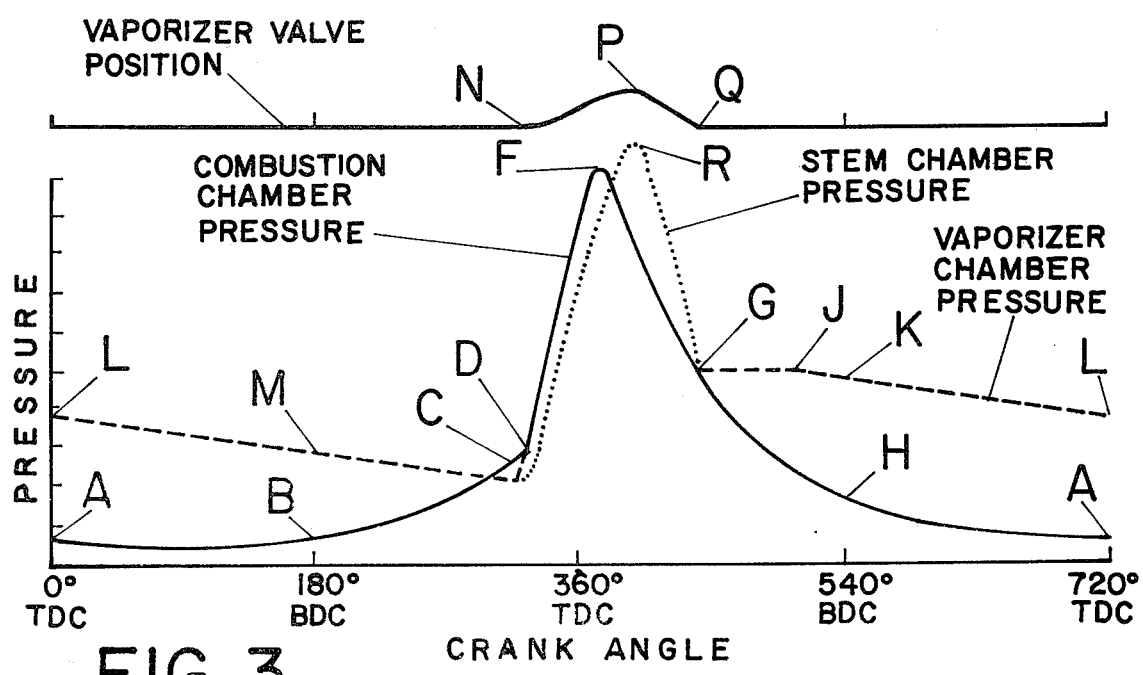

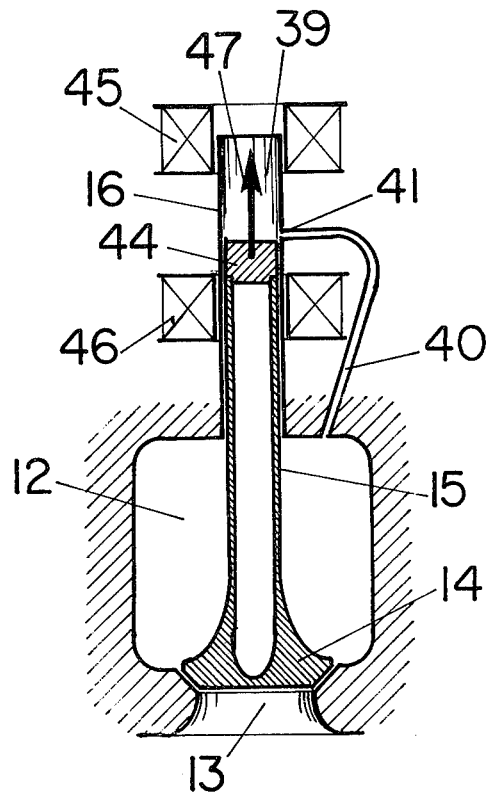
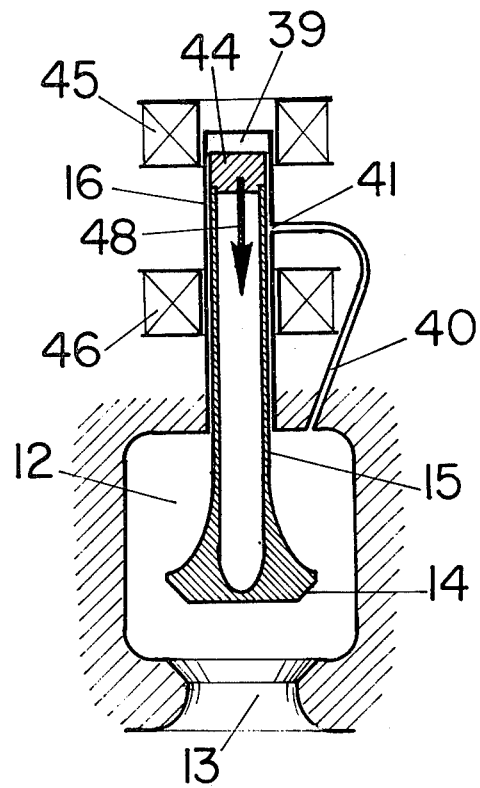
FIG. 4   FIG. 5
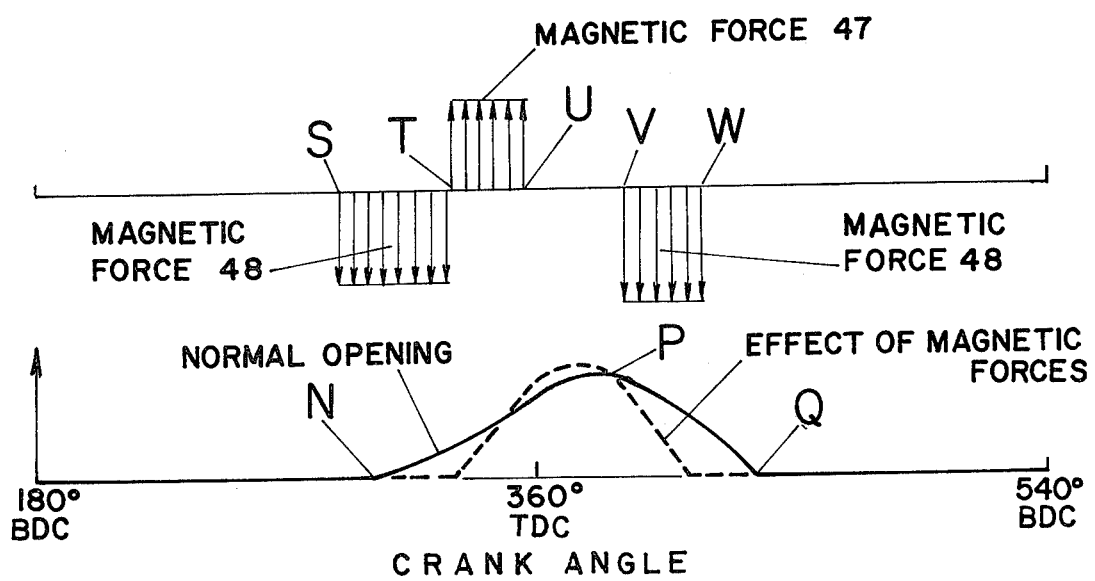
FIG. 6

INTERNAL COMBUSTION ENGINE FOR DIVERSE FUELS

Patent application Ser. No. 06/107,338 filed Dec. 26, 1979, now U.S. Pat. No. 4,372,264, discloses a novel combustion process and devices that permit implementation. This invention is filed as Continuation-in-Part and presents a new valve device that also allows for said novel combustion process to be implemented.

SUMMARY

The intermittent internal combustion engines, as known today, can be divided into two basic categories; (a) the spark ignited, or gasoline engine and (b) the compression ignition, or Diesel engine. Each type of engine requires a different fuel which properties are very specific; the spark ignited engine calls, among others, for a fuel with relative high volatility and high octane number while the Diesel engine requires fuel with relatively low viscosity and high cetane number. Because of these rather narrow and precise required fuel properties the percentage of motor fuel obtainable from crude oil is relatively low. Today engine designers re looking for new ways that will make it possible to utilize lower quality fuels in these engines because it will increase the yield of useful motor fuel obtainable from petroleum. In addition, consider the vast resources of non-petroleum liquid fuels available to us plus the possibility to produce synthetic liquid fuels, and coal-liquid slurries that cannot be utilized in present types of internal combustion engines. It is obvious that a new type of engine that could efficiently accept these low grade fuels will immediately find its way into the motor vehicle and power plant market. It will reduce the nation's dependence on imported crude oil while creating the need for domestic produced alternate fuels and will permit utilizing our immense coal resources.

This invention can easily be incorporated into any type of intermittent internal combustion engine as known today and can immediately be utilized in automobile, stationary power plants, transportation engines, etc., effecting a drastic reduction in the nation's petroleum consumption.

It is the object of this invention to provide intermittent internal combustion engines with means to vaporize a liquid fuel or slurry fuel prior to its mixing with the combustion air. It is a further object of this invention to append a vaporizer chamber interconnected to the conventional combustion chamber of said engine through a valve that can be opened and closed as rerequired. It is a further object of this invention to provide said vaporizer and combustion chambers with a multiplicity of fuel injectors and spark plugs such as to obtain a controllable and dependable combustion with most liquid fuels and slurry fuels regardless of their octane or cetane rating, volatility, viscosity and similar properties required by the spark ignited or Diesel engine. It is still a further object of this invention to achieve combustion inside said engines resulting in low and acceptable emission indexes for carbon monoxide (CO), oxides of nitrogen (NO$_x$), unburned hydrocarbons (UHC) particulate matter and soot.

Other objects, advantages and features will further become apparent hereinafter in the drawings in which:

FIG. 1 is a cross-sectional view of a four-stroke internal combustion engine constructed in accordance with this invention;

FIG. 2 shows a cross-sectional view of a new valving device in open position;

FIG. 3 shows a pressure crank-angle diagram corresponding to an engine constructed in accordance with this invention;

FIGS. 4 and 5 show the new halving device when assisted by electromagnetic means.

FIG. 6 shows the effect on valve opening timing when assisted by electromagnetic forces.

In describing the embodiments of this invention illustrated in the drawings, specific terminology will be used for the sake of clarity. However, it is not intended to be limited to the specific terms so selected and is to be understood that each specific term includes all technical equivalents which operate in a similar manner to accomplish a similar purpose.

In the preferred embodiment of this invention illustrated in FIG. 1, an internal combustion engine, partially shown, is seen to consist of a piston 1, shown near to its top dead center (T D C), cylinder 3, intake valve 5, exhaust valve not shown, means to actuate said intake and exhaust valve in accordance to a four-stroke cycle, a conventional combustion chamber 11, a vaporizer chamber 12 interconnected to said conventional combustion chamber through a passage 13, a vaporizer valve 14 shown in the closed position, valve stem 15, valve guide 16 hermetically closed at one end to form stem chamber 39, passage 40 interconnecting vaporizer chamber 12 to stem chamber 39 through orifice 41, a spark or glow plug 25 reaching vaporizer chamber 12, a fuel injector 27 penetrating into vaporizer chamber 12, a secondary fuel injector 28 penetrating into conventional combustion chamber 11.

In operation, a fresh charge of air or gaseous oxidizer is drawn into cylinder 3 during the downstroke of piston 1 while intake valve 5 is open but exhaust valve and vaporizer valve 14 are closed. During the following upstroke of piston 1 the charge of air is compressed while all valves are closed. Before piston 1 reaches its T D C, the pressure inside combustion chamber 11 will surpass the pressure level prevailing inside vaporizer chamber 12, as a result of this pressure differential across valve 14, a force represented by vector 42 will act upon valve 14 forcing it to open. Assuming the vaporizer chamber 12 is filled with vaporized fuel at a temperature higher than the levels for the compressed charge of air, when vaporizer valve 14 opens the fresh charge of air will transfer from conventional combustion chamber 11 into vaporizer chamber 12 mixing with the vaporized fuel in all gaseous phase. At this point spark plug 25 delivers a spark that ignites the vaporized fuel-compressed air mixture establishing a reverse diffusion flame. It is important to realize that because the fuel is vaporized and it is at a temperature sufficiently high for autoignition, there is no ignition delay involved in the initiation of the chemical reaction, and in addition because of the gaseous state of the fuel the flame front is only controlled by its mixing rate. The important advantages of this new type of internal combustion engine is that any type of liquid fuel or slurry fuel, regardless of its cetane index will instantly ignite and thereafter sustain a vigorous, but smooth, combustion characterized by a noise-free operation of the engine. An added advantage is that a diffusion flame from gaseous mixtures cannot detonate, thus eliminating the need for octane rated fuel. The combustion phase continues while piston 1 reaches its TDC and during a part of the following downstroke that delivers mechanical power to the engine crankshaft. As soon as valve 14 moves away from its seat by the initial impulse of force 42, the pressure inside vaporizer chamber 12 equals the level of pressure inside combustion chamber 11, thus force 42 is reduced in magnitude because the effective area for the pressure differential to act decreased from the area of valve passage 13 to the cross-sectional area of stem 15. However, valve 14 continues to translate by the action of this reduced force 42 and the valve kinetic energy. During the translation of valve 14, the volume of stem chamber 39 diminishes and the gases entrapped inside it are compressed because orifice 41 was covered during the initial translation of valve 14 away from its seat. Pressure inside stem chamber 39 will increase exceeding the pressure level inside vaporizer chamber 12 and thus generate a force represented by vector 43 in FIG. 2. This new force 43 will stop the initial translation of valve 14 and cause it to reverse its movement until valve 14 closes entrapping inside vaporizer chamber 12 hot combustion product gases. After vaporizer valve 14 closes, piston 1 continues the expansion phase of the cycle, followed by the opening of the exhaust valve and the exhausting of combustion products during the next upstroke of piston 1 completing a four-stroke cycle. Notice that after vaporizer valve 14 closes, the entrapped combustion products cannot expand so they maintain their relative high level of pressure and temperature. At a desired point after vaporizer valve 14 was closed, fuel injector 27 sprays liquid fuel or slurry fuel into vaporizer chamber 12. The fuel spray absorbs heat by direct mixing with the entrapped combustion products vaporizing at a finite rate. Now vaporizer chamber 12 contains a mixture of combustion products and vaporized fuel. Notice that the entrapped combustion products contain insignificant amounts of oxygen; consequently, the injected fuel cannot burn inside vaporizer chamber 12. The vaporized fuel is now ready to be mixed with the next charge of compressed air contained inside conventional combustion chamber 11 when valve 14 opens again to repeat the cycle described above.

Passage 40 interconnects vaporizer chamber 12 and stem chamber 39 when valve 14 is closed and orifice 41 is uncovered. This permits equalizing the pressure in both chambers assuring that stem chamber 39 is always filled with gases required to generate force 43.

FIG. 3 represents the pressure variation inside combustion chamber 11, vaporizer chamber 12, stem chamber 39, etc. as a function of engine crank-angle. From point A to point B, the induction of a fresh charge of air takes place, from point B to point C, the air is compressed while all valves are closed, at point C vaporizer valve 14 opens, allowing to vent the contents of conventional combustion chamber 11 into vaporizer chamber 12 through orifice 13. Immediately after, at point D, a spark supplied by spark plug 25 ignites the mixture of vaporized fuel and compressed air. The pressure inside both chambers rapidly increases due to the combustion and the moving of piston 1 traveling towards its TDC. Because the volume of combustion chamber 11 continues to decrease, but the volume of vaporizer chamber 12 is fixed, the flame front established inside vaporizer chamber 12 will be a reverse or inverted diffusion flame. After piston 1 reaches its TDC the common pressure inside combustion and vaporizer chambers peaks at point F. During the expansion phase from point F to point H, vaporizer valve 14 closes at an intermedial point G entrapping hot combustion products inside vaporized chamber 12. The bulk of the combustion products continues the cycle dictated by the displacement of piston 1, from point H to point A the exhaust phase completes the fourth stroke of the cycle. Going back to point G, notice that the relatively high pressure and temperature prevailing inside vaporizer chamber remains approximately constant, dashed line, until when at point J liquid fuel or slurry fuel is injected inside the vaporizer chamber 12, the liquid fuel droplets and particles absorb heat by direct mixing with the entrapped hot combustion products. As a result, the injected fuel vaporizes and superheats. Notice that the residence time available for vaporization includes the evolution time from point J through points K, L, M, and finally to point C when vaporizer valve 14 opens. Point J was selected to emphasize the relative long residence time available for the injected fuel to vaporize. Depending on the particular fuel utilized point J can be shifted to a later time before point C is reached. Notice that the combustion process described above occurs in the presence of some inert combustion product from the previous cycle, its chemistry is similar to the one in exhaust gas recirculation, a technique widely used for $NO_x$ reduction of internal combustion engines. Furthermore, a fully vaporized fuel below stoichiometric fuel-air ratio combusts with minimum emission of UHC, $NO_x$, CO, soot and smoke.

Notice that spark plug 25 does not contribute to the vaporization process that takes place when cycle evolves from point J to point C. When the combustion had evolved up to near point F, most of the vaporized fuel had been consumed; however, inside combustion chamber 11, a fraction of the initial charge of air is still available for combustion. At this point, secondary fuel injector 28 could inject a metered amount of liquid or slurry fuel. Since the temperature level inside combustion chamber 11 is much higher than the one normally obtainable in a Diesel engine, the injected secondary fuel will easily ignite and burn with a diffusion flame much like in a Diesel engine regardless of its cetane rating.

Power can be controlled, like in a Diesel engine, by metering the total amount of fuel injected to each cycle if the aspirated amount of fresh air is nonthrottled. Power can also be controlled by either throttling or superchanging the aspirated fresh air.

Cold starting this engine can be achieved in various manners depending upon the properties of the fuel utilized. Fuel with light viscosity and high volatility can initially be injected into the vaporizer chamber 12 to obtain ignition with assistance of a spark, and after the engine has warmed up a much heavier fuel can be utilized for injection into vaporizer chamber 12 and thus achieve the vaporization described above. A second alternative is to externally preheat the inner walls of the vaporizer chamber 12; with this technique the engine will cold start utilizing heavier fuels. A third alternative is to temporarily mix fuel with the intaking air like in a spark ignited engine and run the engine in this mode until it warms up, and then initiate the fuel injection into vaporizer chamber 12.

FIG. 3 shows in dotted line the pressure variation inside stem chamber 39; notice that this pressure is equal to the level prevailing inside vaporizer chamber 12 as long as vaporizer valve 14 is closed because then orifice 41 is uncovered. After point C, when vaporizer valve 14 starts to open and orifice 41 is covered, the pressure inside stem chamber 39 will rise. When the valve reverses its translation the pressure will decrease to reach the level prevailing inside vaporizer chamber 12 just after vaporizer valve 14 closes. The variation in position of vaporizer valve 14 is graphically shown on the upper part of FIG. 3; at point N, the valve starts to open due to the action of force 42, and at point P the valve reaches its maximum opening and the pressure inside stem chamber 39 reaches its peak level at point R. The action of force 43 will force the valve to close at point Q. The timing of points N, P, and Q is affected by the area of valve opening 13, the cross-sectional area of valve stem 15, the valve total mass, the volume of stem chamber 39, the engine load and engine RPM. Consequently, a variable timing will occur when the engine operates through a range of load and RPM. This variable timing may not be acceptable for certain engine applications demanding optimum performance through a broad range of load and RPM. The variable timing can be diminished or eliminated by imposing upon valve stem an electromagnetic force with a device as shown in FIGS. 4 and 5. Both figures show the same vaporizer valve 14 in cross-sectional view, a hollow stem 15 reduces valve inertia. Valve stem 15 is made of a non-magnetic material except for its end portion 44 that is made of a ferromagnetic material, in addition valve guide 16 and stem chamber 39 are also made of non-magnetic material.

Coils 45 and 46 fitted around valve guide 16 act as electromagnets when energized with an electric current. Referring to FIG. 4, that shows vaporizer valve 14 closed, notice that electromagnet 45 is capable of generating upon magnetic mass 44 a force 47 that can be utilized to anticipate the normal opening of valve 14 or to delay its normal closing time. Normal opening or closing time is defined as the one resulting from the sole action of force 42 or force 43. Electromagnet 46 is capable of generating upon mass 44 a force 48 that can be utilized to delay the normal opening of valve 14 or to anticipate its normal closing time. FIG. 6 shows in solid line a hypothetical normal opening history for valve 14. In dashed line is shown the effect on valve opening history when electromagnet 46 is first energized from point S to point T then electromagnet 45 is energized from point T to point U and again electromagnet 46 is energized from point V to point W. By combining the action of both electromagnets, it is possible to substantially alter the timing for opening and closing vaporizer valve 14.

It will be obvious to those skilled in this art that the invention described above is applicable to any type of intermittent internal combustion engine, four-stroke or two-stroke cycle, reciprocating piston, rotary piston, free piston gas generator, etc.

Various changes and variations may be made without departing from the spirit of this invention and the scope thereof as defined in the following claims:

What I claim is:

1. An intermittent internal combustion engine having a combustion chamber and means for supplying a fresh charge of air thereto, the improvement comprising a fuel vaporizer chamber communicating with said combustion chamber, a vaporizer valve between said fuel vaporizer chamber and said combustion chamber; a stem chamber, a passage interconnecting said stem chamber and said vaporizer chamber when said vaporizer valve is closed, means to cyclically open said vaporizer valve during the compression stroke to discharge the air compressed inside said combustion chamber into said fuel vaporizer chamber to form a combustible mixture, means to cyclically close said vaporizer valve during the expansion stroke of the engine to entrap hot products of combustion within said fuel vaporizer chamber, a fuel injector discharging into said fuel vaporizer chamber, means to supply said fuel injector with a metered amount of liquid or slurry fuel while said combustion products are entrapped whereby the fuel is vaporized inside said fuel vaporizer chamber because it absorbs heat by direct mixing with said entrapped products of combustion.

2. The combination of claim 1 and including a spark plug mounted in said fuel vaporizer chamber, means to fire said spark plug after said vaporizer valve is opened.

3. The combination of claim 1 and including, a secondary fuel injector discharging into said combustion chamber, means to cyclically supply said secondary fuel injector with a metered amount of liquid or slurry fuel.

4. The combination of claim 1 and including, means to supply said fuel injector with various different types of fuels.

5. The combination of claim 1 and including, means to preheat said vaporizer chamber.

6. The combination of claim 1 and including, means to supply fuel to said fresh charge of air such as to form a combustible mixture inside said combustion chamber.

7. An intermittent internal combustion engine having a combustion chamber and means for supplying a fresh charge of air thereto, the improvement comprising a fuel vaporizer chamber communicating with said combustion chamber, a vaporizer valve between said fuel vaporizer chamber and said combustion chamber, said vaporizer valve incorporating a magnetic mass, at least two electromagnets mounted around said magnetic mass, means to cyclically energize said electromagnets, a non-magnetic stem chamber, a passage interconnecting said stem chamber and said vaporizer chamber when said vaporizer valve is closed, means including at least one of said electromagnets to cyclically open said vaporizer valve during the compression stroke to discharge the air compressed inside said combustion chamber into said fuel vaporizer chamber to form a combustible mixture, means including at least another of said electromagnets to cyclically close said vaporizer valve during the expansion stroke of the engine to entrap hot product of combustion within said fuel vaporizer chamber, a fuel injector discharging into said fuel vaporizer chamber, means to supply said fuel injector with a metered amount of liquid or slurry fuel while said combustion products are entrapped whereby the fuel is vaporized inside said fuel vaporizer chamber because it absorbs heat by direct mixing with said entrapped products of combustion.

8. The combination of claim 7 and including, a spark plug mounted in said fuel vaporizer chamber, means to fire said spark plug after said vaporizer valve is opened.

9. The combination of claim 7 and including, a secondary fuel injector discharging into said combustion chamber, means to cyclically supply said secondary fuel injector with a metered amount of liquid or slurry fuel.

10. The combination of claim 7 and including, means to supply said fuel injector with various different types of fuels.

11. The combination of claim 7 and including, means to preheat said vaporizer chamber.

12. The combination of claim 7 and including, means to supply fuel to said fresh charge of air such as to form a combustible mixture inside said combustion chamber.

* * * * *